United States Patent [19]

Corbett

[11] 4,306,036

[45] Dec. 15, 1981

[54] THERMOPLASTIC FOAM AND PROCESS FOR THE PREPARATION THEREOF

[75] Inventor: John M. Corbett, Newark, Ohio

[73] Assignee: The Dow Chemical Company, Midland, Mich.

[21] Appl. No.: 179,576

[22] Filed: Aug. 21, 1980

Related U.S. Application Data

[63] Continuation of Ser. No. 133,086, Mar. 24, 1980, abandoned.

[51] Int. Cl.³ .................. C08J 9/00; C08F 22/04; C08F 22/06
[52] U.S. Cl. .................. 521/147; 521/79; 521/94
[58] Field of Search .................. 521/79, 94, 147

[56] References Cited

U.S. PATENT DOCUMENTS

| | | | |
|---|---|---|---|
| 3,200,176 | 8/1965 | Baxter | 521/79 |
| 3,406,230 | 10/1968 | Baxter et al. | 521/79 |
| 3,537,885 | 11/1970 | Moore et al. | 521/53 |
| 3,547,838 | 12/1970 | Moore et al. | 521/98 |
| 3,633,630 | 1/1972 | Hanson et al. | 138/156 |
| 3,637,459 | 1/1972 | Parrish et al. | 428/138 |
| 3,672,951 | 6/1972 | Moore et al. | 428/322 |
| 3,770,668 | 11/1973 | Corbett | 521/79 |

Primary Examiner—Morton Foelak
Attorney, Agent, or Firm—R. B. Ingraham

[57] ABSTRACT

Anhydride-containing thermoplastic polymers are foamed with ammonium carbonate, ammonium bicarbonate and ammonium oxalate to provide foams having good heat distortion characteristics and undesirable organic blowing agents are avoided.

4 Claims, No Drawings

THERMOPLASTIC FOAM AND PROCESS FOR THE PREPARATION THEREOF

CROSS-REFERENCE TO RELATED APPLICATION

This is a continuation of application Ser. No. 133,086, filed Mar. 24, 1980, now abandoned.

Synthetic resins of thermoplastic foams in many instances are prepared by the extrusion of heat plastified gel containing organic blowing agents such as low boiling hydrocarbons or halogen containing low boiling compounds such as methyl chloride and the various fluorine containing compounds. On extrusion of such blowing agents containing mobile gels into a region of lower pressure, the blowing agent causes the gel to foam. At this period and shortly thereafter frequently blowing agent is released to the atmosphere thereby providing either a flammability hazard, if hydrocarbons are employed, or a halo compound is released to the atmosphere. Oftentimes such blowing agents act as plastifiers for the polymer in which they are used with the result that less than desired heat distortion properties are obtained in the resultant foam. Generally in the extrusion of such thermoplastic foams with organic volatile fluid blowing agents, it is necessary that the mobile gel be prepared in a relatively complex equipment capable of withstanding high internal pressures.

It would be desirable if there were available an improved method for the preparation of synthetic resinous thermoplastic foams.

It would also be desirable if there were available an improved thermoplastic foam having desirable heat distortion characteristics.

It would also be desirable if there were an improved method for the preparation of thermoplastic foam wherein no undesirable gases were released to the atmosphere.

These benefits and other advantages are obtained in a method for the preparation of synthetic resins of thermoplastic foam wherein a synthetic resinous thermoplastic resin in admixture with a blowing agent, is heat plastified under pressure and subsequently extruded to a zone of lower pressure wherein the blowing agent provides gas pressure within the gel forming a plurality of closed cells within the gel and subsequently cooling the foamed mobile gel to a temperature at which it is below its heat plastification temperature, the improvement which comprises employing a major portion of the heat plastifiable resin, an ethylenic addition polymer of mer units having the general formula

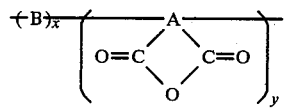

wherein A is at least one tetravalent organic radical having a first pair of valences or vicinal carbon atoms attached to the carbonyl groups and a second pair of valences or vicinal carbon atoms forming part of the polymer chain and arising by addition polymerization of a C=C ethylenic double bond in the monomeric form of A, i.e. an ethylenically unsaturated dicarboxylic acid cyclic anhydride, B is the polymerized mer unit corresponding to at least one ethylenically unsaturated addition polymerizable monomer, and x and y are numbers such that the ratio thereof represents the average proportion on a mole basis of the respective mer units in the polymer and the sum thereof represents the average degree of polymerization in the polymer, and as blowing agent a member selected from the group consisting of ammonium carbonate, ammonium bicarbonate, ammonium oxalate and mixtures thereof.

Also contemplated within the scope of the invention is an improved resinous foam, the foam being prepared from an ethylenic addition polymer of mer units having the general formula

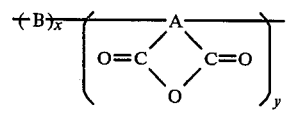

wherein A is at least one tetravalent organic radical having a first pair of valences or vicinal carbon atoms attached to the carbonyl groups and a second pair of valences or vicinal carbon atoms forming part of the polymer chain and arising by addition polymerization of a C=C ethylenic double bond in the monomeric form of A, i.e. an ethylenically unsaturated dicarboxylic acid cyclic anhydride, B is the polymerized mer unit corresponding to at least one ethylenically unsaturated addition polymerizable monomer, and x and y are numbers such that the ratio thereof represents the average proportion on a mole basis of the respective mer units in the polymer and the sum thereof represents the average degree of polymerization in the polymer by heat plastifying polymer in the presence of a blowing agent selected from the group consisting of ammonium carbonate, ammonium bicarbonate, ammonium oxalate and mixtures thereof, the foam containing maleimide groups as determined by infrared spectroscopy.

Polymers suitable for the practice of the present invention are prepared from ethylenically unsaturated monomers the polymerization of which provide polymers that contain from about 2 to 30 weight percent of an ethylenically unsaturated dicarboxylic acid cyclic anhydride.

The ethylenically unsaturated addition polymerizable monomers, from which mer units B are derived, include aliphatic and aromatic hydrocarbons and derivatives thereof having at least one polymerizable ethylenic group, including olefinic monomers such as ethylene and propylene, substituted olefinic monomers such as vinyl chloride, and vinyl acetate, styrenic monomers such as styrene, vinyltoluene, and methylstyrene and ar-halostyrenes, acrylic monomers such as acrylic acid, methacrylic acid, ethyl acrylate and other alkyl acrylates, methyl methacrylate and other alkyl methacrylates and aryl acrylates and methacrylates, acrylonitrile, methacrylonitrile, acrylamide and the like.

The ethylenically unsaturated dicarboxylic acid cyclic anhydride monomers, from which the mer units that include the radical A are derived, include those having the general formula

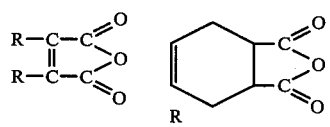

-continued

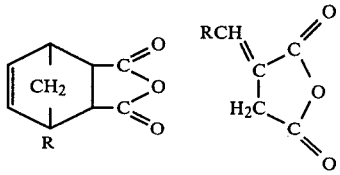

wherein R is hydrogen, alkyl, aryl, halo and other substituent radicals. Illustrative examples of such anhydrides are:
maleic anhydride
citraconic anhydride
itaconic anhydride
phenyl maleic anhydride
tetrahydrophthalic anhydride
bicyclo(2.2.1)hept-5-ene-2,3-dicarboxylic acid anhydride The preparation of such polymers is well known. Blowing agents suitable for the practice of the present invention are ammonium carbonate, ammonium bicarbonate and ammonium oxalate and mixtures thereof. The solid blowing agents are at levels of from about 0.5 to 20 parts by weight/per hundred parts by weight of polymer (pph) and beneficially from 2 to 10 pph depending on the density of the foam desired. Such blowing agents may be used alone or in conjunction with volatile fluorocarbons such as:
Fluorotrichloromethane
dichlorodifluoromethane
fluorodichloromethane
chlorodifluoromethane
chlorodifluoroethane
dichlorotetrafluoroethane
chloropentafluoroethane
difluoropropane
octafluorocyclobutane The presence of such fluorocarbons within the cells results in reduced heat transfer through the foam plastic body. Foams in accordance with the present invention are readily prepared using a screw extruder. Generally, it is desirable to dry blend or admix particulate polymer resin with a particulate blowing agent prior to addition to the screw extruder. Extrusion temperatures suitable for the preparation of foam in accordance with the present invention are approximately the temperature at which the polymer would be extruded if no blowing agent is employed.

The invention is illustrated but not limited to the following examples:

EXAMPLE 1

A dry blend was prepared by mixing the following ingredients at room temperature for 90 minutes in a Hobart Model N-50 mixer. 400 grams of a styrene maleic anhydride copolymer which was a 21.7 weight percent maleic anhydride having a solution of viscosity of 4.97 centipoise as a 10 weight percent of polymer dissolved in methyl ethyl ketone, 1.32 grams of a resinous binder which is a 1 to 1 by weight mixture of a low molecular weight polystyrene and dibutyl phthalate, 4 grams of talc and 20 grams of ammonium bicarbonate. The resultant blend was extruded employing a Brabender Type 2003, ¾" screw extruder with the screw having a length/diameter ratio of 20 to 1. The peripheral temperature of the extruder is maintained at 210° C. and the die temperature 165° C. The die pressure is about 1000 pounds per square inch gauge. The die had an aperture ¼" in diameter. The resultant foam was white, uniform cell structure and had a density of 2.4 pounds per cubic foot. A portion of the foam was analyzed by infrared spectroscopy and showed evidence of the maleimide structure.

EXAMPLE 2

Procedure of Example 1 was repeated with the exception that the 20 grams of ammonium carbonate was replaced with 20 grams of ammonium bicarbonate. The resultant foam had a desirable color, uniform cell structure and a density of 9.3 pounds per cubic foot.

Similar beneficial results are obtained when ammonium oxalate is used in place of ammonium carbonate or ammonium bicarbonate and the foams obtained in accordance with the present invention have desirably higher heat distortion temperatures and improved solvent resistance.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An improved extruded closed-cell resinous foam, the foam being prepared from an ethylenic addition polymer consisting essentially of mer units having the general formula

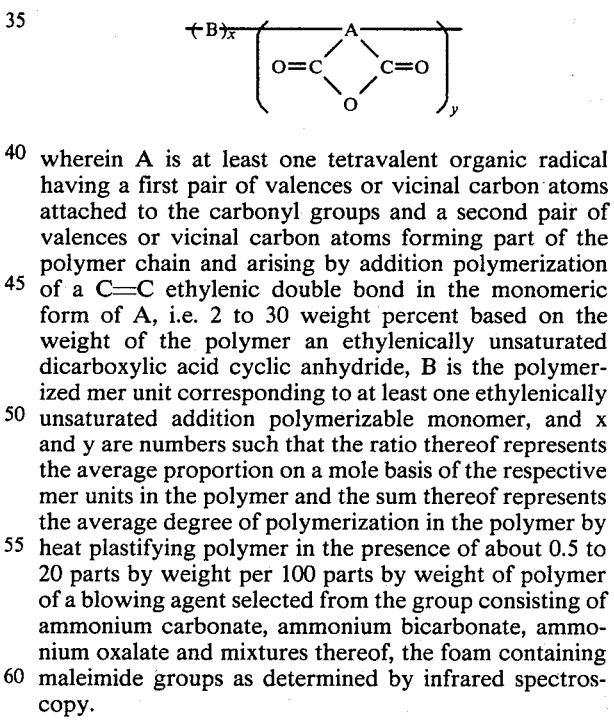

wherein A is at least one tetravalent organic radical having a first pair of valences or vicinal carbon atoms attached to the carbonyl groups and a second pair of valences or vicinal carbon atoms forming part of the polymer chain and arising by addition polymerization of a C=C ethylenic double bond in the monomeric form of A, i.e. 2 to 30 weight percent based on the weight of the polymer an ethylenically unsaturated dicarboxylic acid cyclic anhydride, B is the polymerized mer unit corresponding to at least one ethylenically unsaturated addition polymerizable monomer, and x and y are numbers such that the ratio thereof represents the average proportion on a mole basis of the respective mer units in the polymer and the sum thereof represents the average degree of polymerization in the polymer by heat plastifying polymer in the presence of about 0.5 to 20 parts by weight per 100 parts by weight of polymer of a blowing agent selected from the group consisting of ammonium carbonate, ammonium bicarbonate, ammonium oxalate and mixtures thereof, the foam containing maleimide groups as determined by infrared spectroscopy.

2. The foam of claim 1 wherein mer A is maleic anhydride.

3. The foam of claim 1 wherein mer B is styrene.

4. The foam of claim 1 wherein mer A is maleic anhydride, mer B is styrene and the blowing agent employed to form the foam is ammonium bicarbonate.

* * * * *